United States Patent [19]
Lee

[11] Patent Number: 6,154,350
[45] Date of Patent: Nov. 28, 2000

[54] SOFT ADJACENT LAYER-BIASED MAGNETORESISTIVE HEAD AND METHOD

[75] Inventor: Hae-jung Lee, Gumi, Rep. of Korea

[73] Assignee: SamSung Electronics Co., Ltd., Suwon, Rep. of Korea

[21] Appl. No.: 09/223,323

[22] Filed: Dec. 30, 1998

[30] Foreign Application Priority Data

Dec. 30, 1997 [KR] Rep. of Korea ...................... 97-77816

[51] Int. Cl.[7] ....................................................... G11B 5/39
[52] U.S. Cl. ....................................................... 360/327.22
[58] Field of Search ............................... 360/113, 327.1, 360/327.22, 327.2; 324/207.21, 252; 338/32 R

[56] References Cited

U.S. PATENT DOCUMENTS

| | | | |
|---|---|---|---|
| 3,864,751 | 2/1975 | Beaulieu et al. | 360/113 |
| 4,833,560 | 5/1989 | Doyle | 360/113 |
| 5,532,892 | 7/1996 | Nix et al. | 360/113 |
| 5,600,518 | 2/1997 | Koga | 360/113 |
| 5,694,275 | 12/1997 | Watanabe et al. | 360/113 |
| 5,768,067 | 6/1998 | Saito et al. | 360/113 |
| 5,784,226 | 7/1998 | Ishi | 360/113 |
| 5,805,389 | 9/1998 | Saito et al. | 360/113 |
| 5,828,526 | 10/1998 | Kagawa et al. | 360/113 |
| 5,943,763 | 8/1999 | Shouji et al. | 29/603.14 |
| 5,959,809 | 9/1999 | Uehara | 360/113 |
| 5,966,272 | 10/1999 | Cain | 360/113 |

OTHER PUBLICATIONS

"Magnetoresistive Heads–Fundamentals And Applications", Academic Press, pp. 25–27; pp. 76–77, 1996.
"The Era of Magnetoresistive Heads", IBM Storage, IBM Internet website, four (4) pages, Nov. 4, 1997.

*Primary Examiner*—Brian E. Miller
*Attorney, Agent, or Firm*—Robert E. Bushnell, Esq.

[57] ABSTRACT

An MR head is biased to a soft adjacent layer so that deflection angles at any point around the MR element are made uniform. The SAL-biased MR head includes a SAL divided into a plurality of layers for applying a transverse bias field, insulators disposed between each of the SAL layers, an MR element in which resistance varies according to the direction and magnitude of the magnetic flux which is detected, an insulator disposed between the SAL and the MR element, and a current source for providing current to the respective SAL layers and the MR element. Thus, since a plurality of layers are used, a bias angle in the MR element becomes almost equal at any position.

23 Claims, 5 Drawing Sheets

SOFT ADJACENT LAYER-BIASED MAGNETORESISTIVE HEAD AND METHOD

This application makes reference to, incorporates the same herein, and claims all benefits accruing under 35 U.S.C. §119 from an application for SOFT ADJACENT LAYER-BIASED MAGNETORESISTIVE HEAD earlier filed in the Korean Industrial Property Office on the 30$^{th}$ of December 1997 and there duly assigned Ser. No. 77816/1997.

BACKGROUND OF THE INVENTION

1. Field of the Invention

The present invention relates to a magnetoresistive head (hereinafter, called MR head), and more particularly, to an MR head which is biased to a soft adjacent layer (hereinafter, called SAL) so as to make deflection angles at any point of the MR element uniform.

2. Description of the Related Art

An MR head basically consists of separate read and write elements. The write element is a thin-film inductive head and the read element consists of an alloy film, usually NiFe, that exhibits a change in resistance in the presence of a magnetic field, i.e., a magnetoresistive (MR) effect.

The MR head is known to have a superior capability of reading data from a magnetic recording medium to that of an inductive head or a thin-film head. The MR head detects a magnetic-field signal as a magnetic-flux function through a change in resistance of the read element made of a magnetoresistive material. Namely, as the resistance of the MR element varies according to the direction and size of the detected magnetic flux, the MR head is used to detect a magnetic signal from a magnetic recording medium.

FIGS. 1A through 1E are views for explaining a SAL-biased MR sensor according to the conventional technology. Here, FIG. 1A is a perspective view showing the structure of the MR sensor; FIG. 1B is a basic circuit diagram showing the MR sensor; FIG. 1C is a view showing the relationship between a SAL and the MR element; FIG. 1D is a view showing the direction and size of biasing at each point of the MR sensor; and FIG. 1E is a view showing a biasing angle at each point of the MR sensor.

Referring to FIGS. 1A and 1B, the MR sensor consists of a SAL 11 (15), a MR element 13 (16), and an insulator 12. Current $i_b$ and current $i_s$ respectively flow through the SAL 11 (15) and the MR element 12 (16) from a current source 14 (17).

Referring to FIGS. 1C, 1D and 1E, since the SAL 18 is formed in one body, the intensity of the magnetic field generated around the SAL 18 differs at each portion of the MR element 19. Also, it can be seen that the angle of deflection of an easy direction is not uniform in the MR element. That is, the sizes of $H_b$ at points A, B, C, D and E are different from one another so that the angle of deflection differs at every point. Due to this non-uniformity, noise is generated with the MR sensor and the MR ratio, ΔR/R, that is an indicator of MR performance, deteriorates.

U.S. Pat. No. 3,864,751 to Beaulier et al., entitled *Induced Bias Magnetoresistive Read Transducer*, discloses a magnetoresistive (MR) read transduce that has one MR element an a soft magnetic bias film that is electrically insulated from the MR element. It is disclosed when current is applied to the MR element, the bias film is magnetically saturated, and provides a magnetizing bias field lo the MR element, wherein the bias field is independent of the sense current amplitude and of the output signal.

U.S. Pat. No. 4,833,560 to Doyle, entitled *Self-Biased Magnetoresistive Reproduce Head*, discloses a magnetoresistive reproduce head which is self-biased by a saturated soft adjacent layer magnetically coupled to the magnetoresistive element, wherein the induced anisotropy fields of the magnetoresistive element and the soft adjacent layer are made to lie in the direction of the bias field at the magnetoresistive element rather than perpendicular to the bias field. It is disclosed that these induced anisotropy fields partially counteract demagnetizing fields which oppose the bias field, and thereby lover the current in the magnetoresistive element required to saturate the soft adjacent layer in biasing the magnetoresistive element. It is disclosed the lowered current reduces the Joule heating of the magnetoresistive element.

U.S. Pat. No. 5,600,518 to Koga, entitled *Magnetoresistive Head Having A Stepped Magnetoresistive Film Element*, discloses a magnetoresistive head for use in, for example, a magnetic recording/reproducing device such as a magnetic disk unit. It is disclosed that the magnetoresistive head includes a substrate, a magnetoresistive element film, first and second antiferromagnetic films, and first and second lead layers mounted on the first and second antiferromagnetic films for supplying a sense current to the magnetoresistive element film. It is disclosed that the magnetoresistive element film includes first and second stepped side portions each having a thickness smaller than that of a central portion of the magnetoresistive element film which defines a reproducing section. The first and second antiferromagnetic films are disclosed as being formed on the first and second stepped side portions of the magnetoresistive element film. It is disclosed that Barkhausen noise is reduced while maintaining a reproduced output voltage at a desired level.

U.S. Pat. No. 5,694,275 to Watanabe et al., entitled *Magnetoresistive Magnetic Head*, discloses a magnetoresistive magnetic head having a laminate composed of a magnetoresistive (MR) layer showing the magnetoresistive effect, a SHUNT layer as a non-magnetic layer and a soft adjacent layer (SAL) for applying a transverse bias magnetic field to the MR layer, wherein the MR layer and the SAL are made of the same $Ni_{81}Fe_{19}$ magnetic film. It is disclosed that since the SAL is magnetically saturated in the same direction as the direction of leakage flux of recording medium (y direction), permeability thereof in the y direction decreases, and the MR effect function therein can be restricted. It is disclosed that although the MR layer and the SAL have the same specific resistance, a sufficient detection current can be made to flow through the MR layer and a high-precision magnetic detection output can be obtained by making the MR layer thicker than the SAL.

U.S. Pat. No. 5,768,067 to Saito et al., entitled *Magnetoresistive Head Using Exchange Anisotropic Magnetic Field With An Antiferromagnetic Layer*, discloses a magnetoresistive head including a magnetoresistive film formed in a read-track region, and antiferromagnetic and ferromagnetic films are formed on each end of the magnetoresistive film outside of the read-track region such that bias magnetization is applied to the magnetoresistive film by exchange coupling between the antiferromagnetic film and the ferromagnetic film. It is disclosed a nonmagnetic intermediate film is formed between the ferromagnetic film and the magnetoresistive film for preventing ferromagnetic coupling on a contact boundary surface between the ferromagnetic film and the magnetoresistive film.

U.S. Pat. No. 5,805,389 to Saito et al., entitled *Magnetoresistive Head*, discloses a magnetoresistive head including longitudinal bias layers composed of α—$Fe_2O_3$ provided under an magnetoresistive layer in close contact therewith, wherein an exchange anisotropic magnetic field is applied to the magnetoresistive layer from the longitudinal bias layers and the coercive force of the magnetoresistive layer is increased to several hundred Oe in exchange coupling regions with which the longitudinal bias layers are in close contact. It is disclosed the magnetization direction of the exchange coupling regions becomes stable in the x axis direction and sufficient longitudinal bias magnetic field is thereby applied to a region corresponding to the track width (Tw) of the magnetoresistive layer, wherein decreased Barkhausen noise and improved magnetic detection characteristics can be achieved.

"MAGNETORESISTIVE HEADS-FUNDAMENTALS AND APPLICATIONS", Academic Press, pages 25–27 and 76–77 (1996), discusses the anisotropic magnetoresistive effect, magnetoresistive sensors or elements, and shielded MRH designs. "THE ERA OF MAGNETORESISTIVE HEADS", IBM Storage, IBM Internet website, four (4) pages (Nov. 4, 1997) discusses MR head design and MR sensor technology, including a soft adjacent layer(SAL) biased-MR sensor structure, and giant magnetoresistive heads are discussed.

SUMMARY OF THE INVENTION

To solve the above problem, it is an objective of the present invention to provide an MR head in which the angle of deflection at every point of an MR element is uniform.

Accordingly, to achieve the above and other objectives of the present invention, there is provided a SAL-biased MR head to make a deflection angle equal at any point around an MR head, comprising a SAL divided into a plurality of layers for applying a transverse bias field, insulators disposed between each of the SAL layers, an MR element in which resistance varies according to the direction and magnitude of the magnetic flux which is detected, an insulator disposed between the SAL and the MR element, and a current source for providing current to the respective SAL layers and the MR element.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

To operate an MR head in an optimal state, two bias fields, i.e., a transverse bias field and a longitudinal bias field are necessary. The transverse bias field sets the orientation of magnetization on the surface of an MR element at about 45 degrees with respect to the direction of a sense current so that reaction of the MR head to magnetic flux becomes linear. The longitudinal bias field is distributed parallel to both a surface of a magnetic recording medium and the longitudinal direction of an MR current. The end portion of the MR head is maintained in a single domain state so that Barkhausen noise can be removed.

To effectively operate the MR head, the rotation of the MR head should be linear by forming the transverse bias field. The transverse bias field is applied to be perpendicular to the surface of the magnetic recording medium and parallel to the surface of the MR head. In the methods of generating the transverse bias field, there is a current shunt and a SAL method. The method generally provides a higher area density.

In a SAL-biased MR sensor, a current flowing through an MR sensor generates a magnetic field that interacts with magnetization of a soft film disposed under the MR sensor. By the transverse biasing, a magnetic rotation in an MR film makes an optimal angle with respect to the sense current so that an MR signal of a desirable linear response can be generated. Also, to maintain stability of the MR sensor and reduce magnetic noise, a longitudinal bias is provided by an additional layer, i.e., an exchange-bias layer or a hard-bias layer.

Figure 1A:
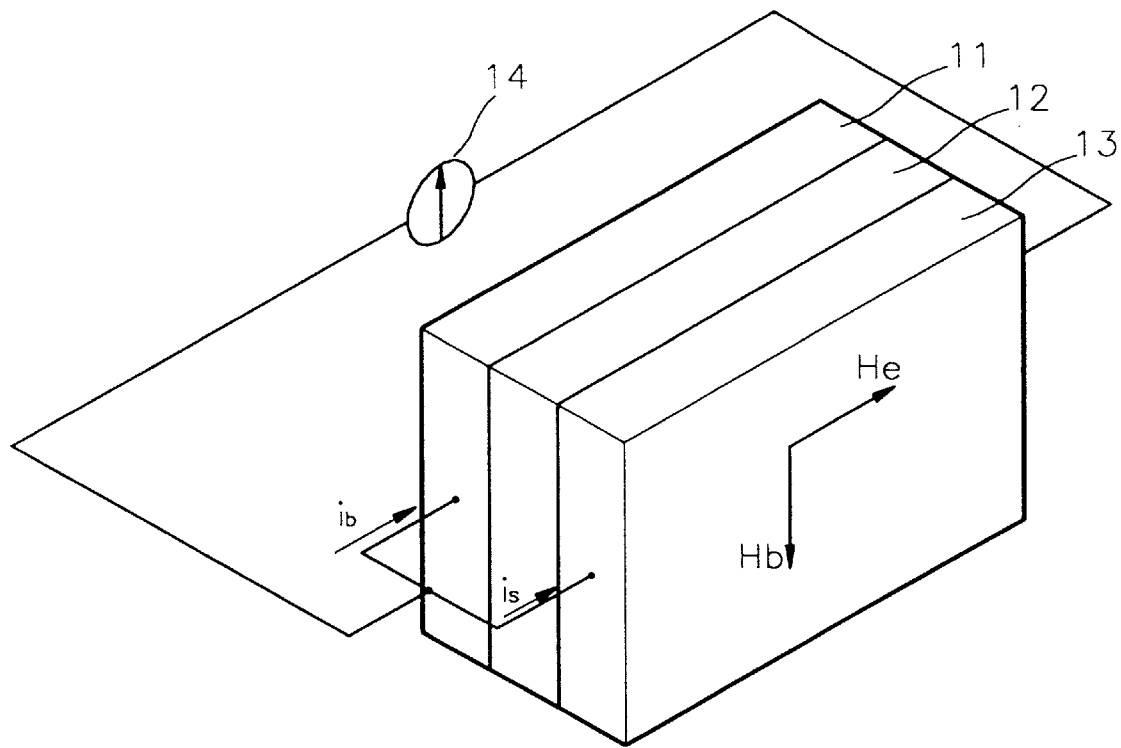
FIGS. 1A through 1E are views for explaining a SAL-biased MR sensor according to the conventional technology.
Figure 1B:
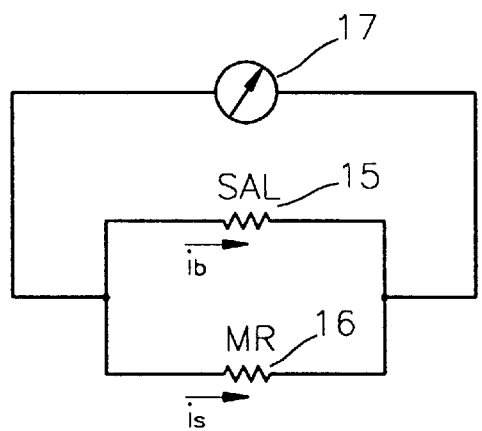
Figure 1C:
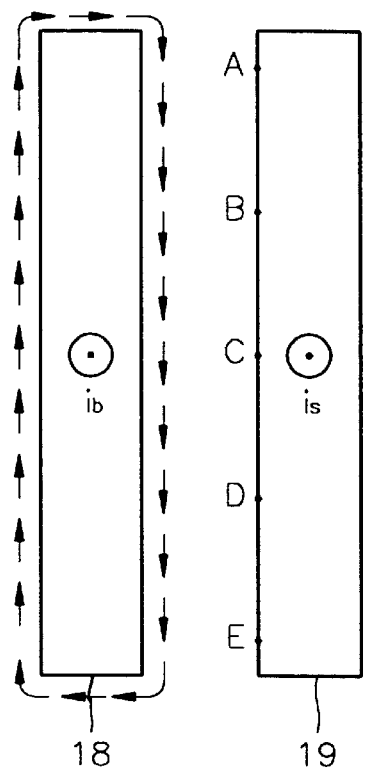
Figure 1D:
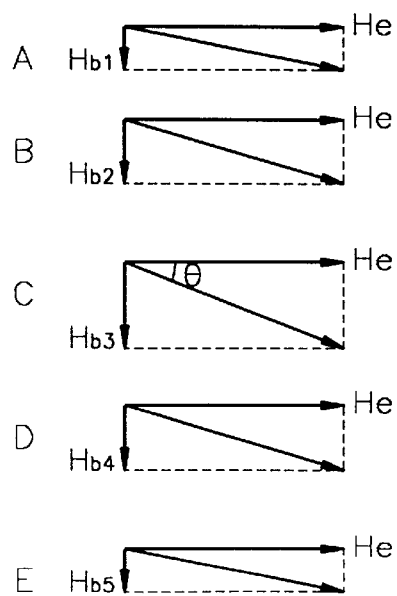
Figure 1E:
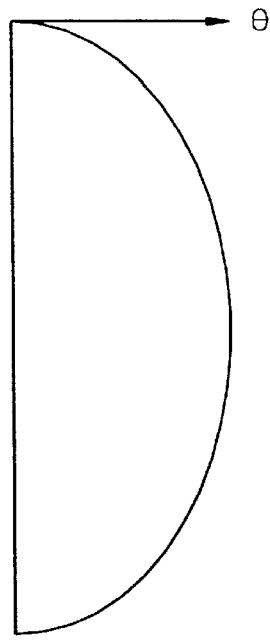
Figure 2A:
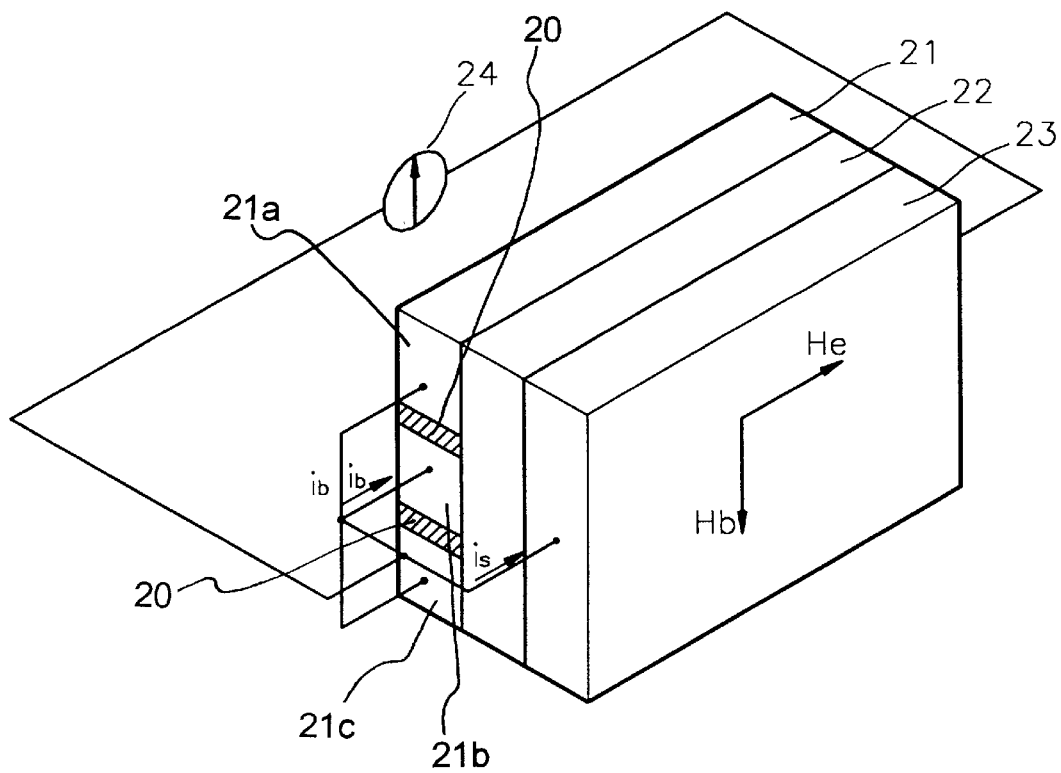
FIGS. 2A through 2E are views for explaining a SAL-biased MR sensor according to the present invention.
Figure 2B:
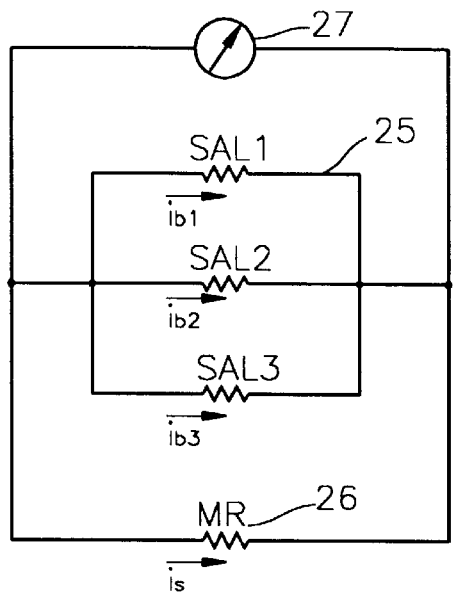
Figure 2C:
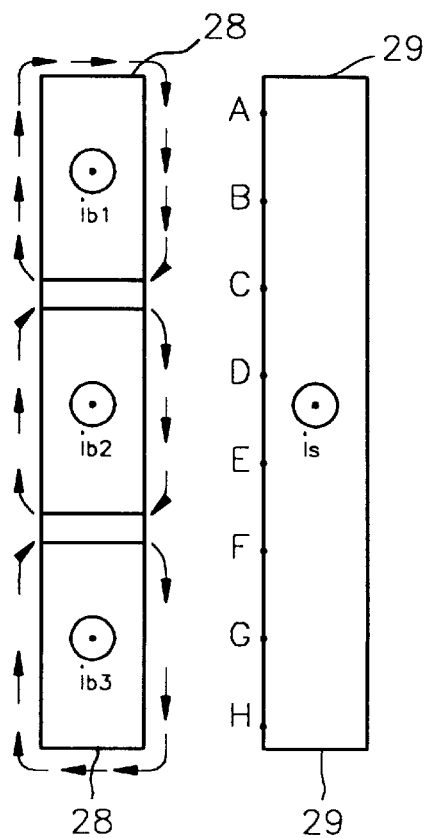
Figure 2D:
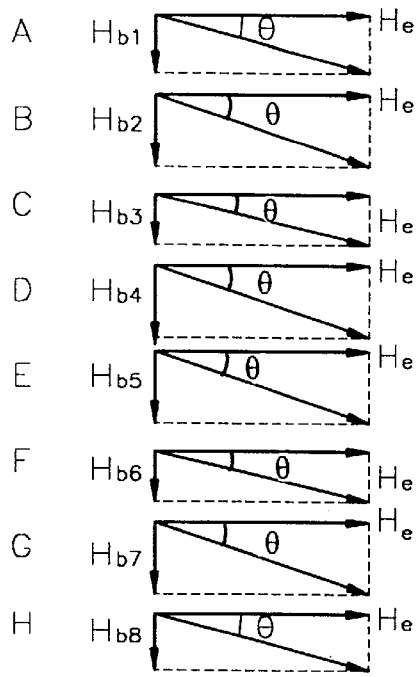
Figure 2E:
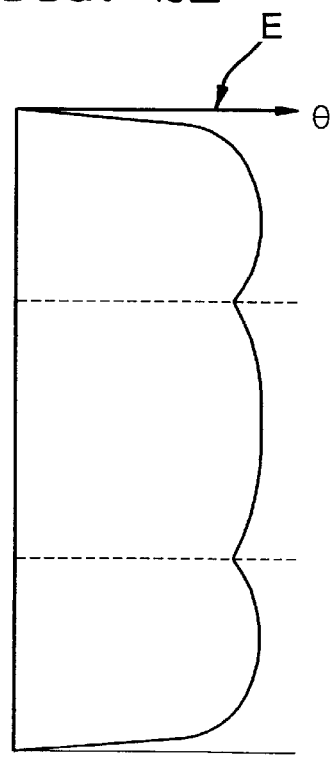

FIGS. 2A through 2E are views for explaining a SAL-biased MR sensor according to the present invention. Here, FIG. 2A is a perspective view showing the structure of the MR sensor; FIG. 2B is a basic circuit diagram showing the MR sensor; FIG. 2C is a view showing the relationship between a SAL and the MR element; FIG. 2D is a view showing the direction and size of biasing at each point of the MR sensor; and FIG. 2E is a view showing a biasing angle at each point of the MR sensor.

Referring to FIGS. 2A and 2B, an MR sensor according to the present invention includes a SAL 21 (25) having a plurality of layers, the SAL layers including a soft magnetic material, for example, an insulator 20 between the SAL layers, an MR element 23 (26), the MR element including a material having a high magnetoresistive effect, such as a Ni—Fe material, for example, and an insulator 22 between the SAL 21 (25) and the MR element 23 (26). Currents $i_b$ and $i_s$ flow from a current source 24 (27) respectively to the SAL 21 (25) and the MR element 23 (26).

In the present invention, the SAL 21 (25) is divided into a plurality of layers 21a (SAL 1), 21b (SAL 2) and 21c (SAL 3), for example, which are arranged parallel to each other so that, irrespective of the position of the MR element 23 (26), the intensity of the magnetic field around the SAL 21 (25) can be uniform. Accordingly, the deflection angle around the MR element also becomes uniform.

In FIG. 2C, reference numerals 28 and 29 represents the SAL 21 (28) having three layers 21a, 21b, 21c and the MR element 23 (29), respectively. Arrows around the SAL 28 indicate biasing flux. In FIG. 2D, $H_{b1}$ through $H_{b8}$ indicate biases by the SAL current $i_b$ at points A through H and $H_e$ indicates the bias in an easy direction.

As shown in FIG. 2D, the SAL is divided into a plurality of layers and current is applied to each SAL layer so that the magnitude of H$b$ at each of the points A through H is almost or substantially equal. Thus, as shown in FIG. 2E, since the deflection angle θ becomes almost uniform at the respective points A through H, the easy direction E in the MR layer or element becomes equal regardless of its position.

As described above, in the SAL-biased MR head according to the present invention, since a plurality of layers are used, a bias angle in the MR element becomes almost equal at any position.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modification may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A soft adjacent layer-biased magnetoresistive head, comprising:
   a soft adjacent layer divided into a plurality of layers for applying a transverse bias field;
   a plurality of first insulators respectively disposed between each of adjacent ones of said plurality of layers of said soft adjacent layer;
   a magnetoresistive element having a resistance which varies according to a direction and a magnitude of a magnetic flux;
   a second insulator disposed between said soft adjacent layer and said magnetoresistive element; and
   a current source for providing current to said plurality of layers of said soft adjacent layer and to said magnetoresistive element, whereby a deflection angle corresponding to biasing is substantially equal around said magnetoresistive element.

2. The soft adjacent layer-biased magnetoresistive head according to claim 1, further comprised of said plurality of layers of said soft adjacent layer being arranged parallel to each other.

3. The soft adjacent layer-biased magnetoresistive head according to claim 2, further comprised of said plurality of layers of said soft adjacent layer comprising three layers.

4. The soft adjacent layer-biased magnetoresistive head according to claim 2, further comprised of an intensity of a magnetic field around said soft adjacent layer being uniform.

5. The soft adjacent layer-biased magnetoresistive head according to claim 2, further comprised of an intensity of a magnetic field around said soft adjacent layer being uniform.

6. The soft adjacent layer-biased magnetoresistive head according to claim 2, further comprised of an easy direction in said magnetoresistive element being equal regardless of position with respect to said magnetoresistive element.

7. The soft adjacent layer-biased magnetoresistive head according to claim 6, further comprised of an intensity of a magnetic field around said soft adjacent layer being uniform.

8. The soft adjacent layer-biased magnetoresistive head according to claim 1, further comprised of an intensity of a magnetic field around said soft adjacent layer being uniform.

9. The soft adjacent layer-biased magnetoresistive head according to claim 1, further comprised of an easy direction in said magnetoresistive element being equal regardless of position with respect to said magnetoresistive element.

10. The soft adjacent layer-biased magnetoresistive head according to claim 9, further comprised of an intensity of a magnetic field around said soft adjacent layer being uniform.

11. A soft adjacent layer-biased magnetoresistive head, comprising:
    a soft adjacent layer divided into a plurality of layers for applying a transverse bias field;
    a plurality of first insulators respectively disposed between each of adjacent ones of said plurality of layers of said soft adjacent layer;
    a magnetoresistive element having a resistance which varies according to a direction and a magnitude of a magnetic flux;
    a second insulator disposed between said soft adjacent layer and said magnetoresistive element; and
    a current source for providing current to said plurality of layers of said soft adjacent layer and to said magnetoresistive element, whereby a deflection angle corresponding to biasing is uniform around said magnetoresistive element.

12. A method for forming a soft adjacent layer-biased magnetoresistive head, comprising the steps of:
    providing a soft adjacent layer divided into a plurality of layers for applying a transverse bias field;
    disposing a plurality of first insulators respectively between each of adjacent ones of said plurality of layers of said soft adjacent layer;
    providing a magnetoresistive element having a resistance which varies according to a direction and a magnitude of a magnetic flux;
    disposing a second insulator between said soft adjacent layer and said magnetoresistive element; and
    providing a current source for providing current to said plurality of layers of said soft adjacent layer and to said magnetoresistive element, whereby a deflection angle corresponding to biasing is substantially equal around said magnetoresistive element.

13. The method according to claim 12, further comprised of said plurality of layers of said soft adjacent layer being arranged parallel to each other.

14. The method of claim 13, further comprised of said plurality of layers of said soft adjacent layer comprising three layers.

15. The method according to claim 12, further comprised of an intensity of a magnetic field around said soft adjacent layer being uniform.

16. The method according to claim 13, further comprised of an easy direction in said magnetoresistive element being equal regardless of position with respect to said magnetoresistive element.

17. A method for forming a soft adjacent layer-biased magnetoresistive head, comprising the steps of:
    providing a soft adjacent layer divided into a plurality of layers for applying a transverse bias field;
    disposing a plurality of first insulators respectively between each of adjacent ones of said plurality of layers of said soft adjacent layer;
    providing a magnetoresistive element having a resistance which varies according to a direction and a magnitude of a magnetic flux;
    disposing a second insulator between said soft adjacent layer and said magnetoresistive element; and p1 providing a current source for providing current to said plurality of layers of said soft adjacent layer and to said magnetoresistive element, whereby a deflection angle corresponding to biasing is uniform around said magnetoresistive element.

18. The method according to claim 17, further comprised of an intensity of a magnetic field around said soft adjacent layer being uniform.

19. A soft adjacent layer-biased magnetoresistive head, comprising:
    a soft adjacent layer divided into a plurality of layers for applying a transverse bias field;
    a plurality of first insulators respectively disposed between each of adjacent ones of said plurality of layers of said soft adjacent layer;
    a magnetoresistive element having a resistance which varies according to a direction and a magnitude of a magnetic flux; and a second insulator disposed between said soft adjacent layer and said magnetoresistive element, whereby a deflection angle corresponding to biasing is substantially equal around said magnetoresistive element.

20. The soft adjacent layer-biased magnetoresistive head according to claim 19, further comprised of said plurality of layers of said soft adjacent layer being arranged parallel to each other.

21. The soft adjacent layer-biased magnetoresistive head according to claim 19, further comprised of an intensity of a magnetic field around said soft adjacent layer being uniform, and an easy direction in said magnetoresistive element being equal regardless of position with respect to said magnetoresistive element.

22. A soft adjacent layer-biased magnetoresistive head, comprising:

a soft adjacent layer divided into a plurality of layers for applying a transverse bias field;

a plurality of first insulators respectively disposed between each of adjacent ones of said plurality of layers of said soft adjacent layer;

a magnetoresistive element having a resistance which varies according to a direction and a magnitude of a magnetic flux; and a second insulator disposed between said soft adjacent layer and said magnetoresistive element, whereby an intensity of a magnetic field around said soft adjacent layer is uniform, and whereby a deflection angle corresponding to biasing is uniform around said magnetoresistive element.

23. The soft adjacent layer-biased magnetoresistive head according to claim 22, further comprised of said plurality of layers of said soft adjacent layer being arranged parallel to each other.

* * * * *